Dec. 8, 1953  A. D. WILEY  2,662,201
CONTROL OF ARC OPERATION.
Original Filed Oct. 23, 1946  2 Sheets-Sheet 1

Inventor
ALLEN DALE WILEY,
By
Attorneys.

Dec. 8, 1953    A. D. WILEY    2,662,201
CONTROL OF ARC OPERATION
Original Filed Oct. 23, 1946    2 Sheets-Sheet 2

Inventor
ALLEN DALE WILEY,
By
Attorneys.

Patented Dec. 8, 1953

2,662,201

UNITED STATES PATENT OFFICE 2,662,201

CONTROL OF ARC OPERATION

Allen Dale Wiley, Middletown, Ohio, assignor to Armco Steel Corporation, Middletown, Ohio, a corporation of Ohio Original application October 23, 1946, Serial No. 705,144. Divided and this application May 10, 1950, Serial No. 161,194

12 Claims. (Cl. 315—206)

The principal object of this invention is the provision of means and a method for arc operation in welding or deposition, under conditions of more nearly perfect control and with greater uniformity in the operation, and is a division of my copending application Serial No. 705,144, filed October 23, 1946, and now abandoned. I shall describe my invention as applied to continuous arc welding, as an exemplary field of utility.

In general practice, a feeding mechanism is provided to feed to the work a weld rod, which is one of the arc electrodes, the work itself being the other. The feeding means constitutes a welding head and comprises a motor which drives a pinch roll feeding combination for the weld rod through a train of reduction gearing.

In the operation of welding, various factors tend to produce non-uniformity. There are likely to be sporadic variations in the voltage of power lines which either directly or through transformers or motor generators produce changes in the arc energy.

Moreover, there are factors which produce sporadic changes in the length of the arc path and hence produce changes in the voltage required for uniform operation. These include inequalities in the work, the presence of tack welds, and the like. Metal from the weld rod is deposited in the seam. This is not always a uniform and continuous operation. Frequently large drops of molten metal fall away from the weld rod. Since the arc path is quite short, these variations produce large percentages of change in its length.

The system of control hitherto employed involved feeding the weld rod at varying rates of speed in an attempt to compensate for these fluctuations. In one such system, by way of example, a small, control motor-generator is provided. The generator field is coupled into a circuit which is in shunt to the welding arc. The output of the generator is used to operate the motor of the weld rod feeding head. Thus, the weld rod is fed to the work at constantly varying rates of speed in an endeavor to compensate for variations in the welding conditions. Such systems have given generally a good account of themselves when welding fairly heavy metal stock where the maintenance of a large pool of molten metal tends to make the heat conditions much more uniform. In the welding of thinner gage materials they have not been very successful; and blow holes in the weld as well as imperfectly welded areas are common.

The first defect of such systems is their lagging response to changes in the welding conditions, which changes occur with extreme rapidity. Motor-generators as well as the feeding motor are characterized by inertia and lagging; and there is substantial lost motion in the transmission means. Yet the art has gone about as far as it can in attempts to eliminate these lags.

In my invention I depart completely from the current systems of control. Instead of attempting to feed the weld rod at varying rates of speed in response to changing conditions in the arc, I feed my weld rod at a continuous or fixed rate of speed adjusted to the average welding requirement, and then I modify the welding current and voltage in accordance with changing conditions in the arc. I may employ electromechanical means for doing this, but a great advantage of my system of control is that purely electrical means may be employed, the response of which is not characterized by any appreciable lag. Thus, the welding current and voltage is made instantaneously responsive to sporadic changes of requirements in the arc itself, and uniformity of welding is thus obtained. Furthermore, using my system of control, I am able to produce uniform and perfect welds in very much thinner materials than could heretofore be handled; and a continuous and fairly uniform weld is no longer dependent upon the maintenance of a large pool of molten metal. It is another advantage of my system of control that the apparatus involved is much less bulky and much less expensive than the control means heretofore employed.

The attainment of these advantages form other objects of this invention; and I accomplish them together with others which will be set forth hereinafter or will be apparent to one skilled in the art upon reading these specifications, by that procedure and combination of instrumentalities of which I shall now describe certain exemplary embodiments.

Reference is made to the accompanying drawings wherein.

Figure 1:
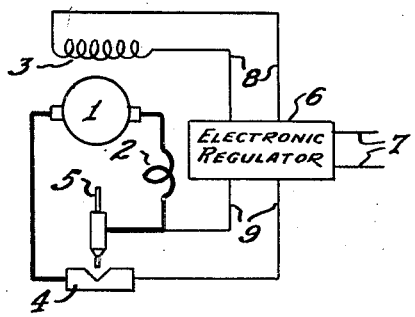
Figure 1 is a diagrammatic representation of a direct current welding system in which an electronic regulator is used.
Figure 3:
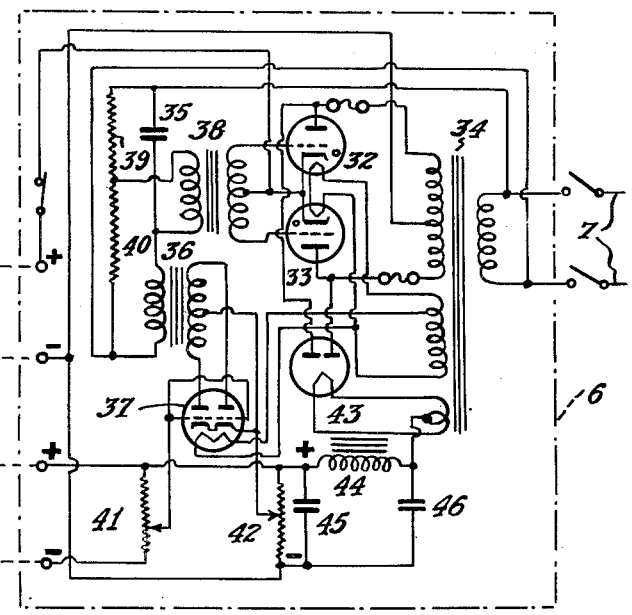

Figure 3 corresponds to Figure 1 but illustrates the details of a suitable electronic regulator.

Figure 2:
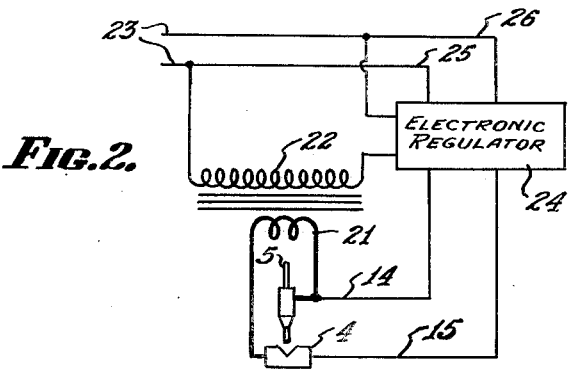
Figure 2 is a diagrammatic representation of an alternating current system employing an electronic regulator.
Figure 4:
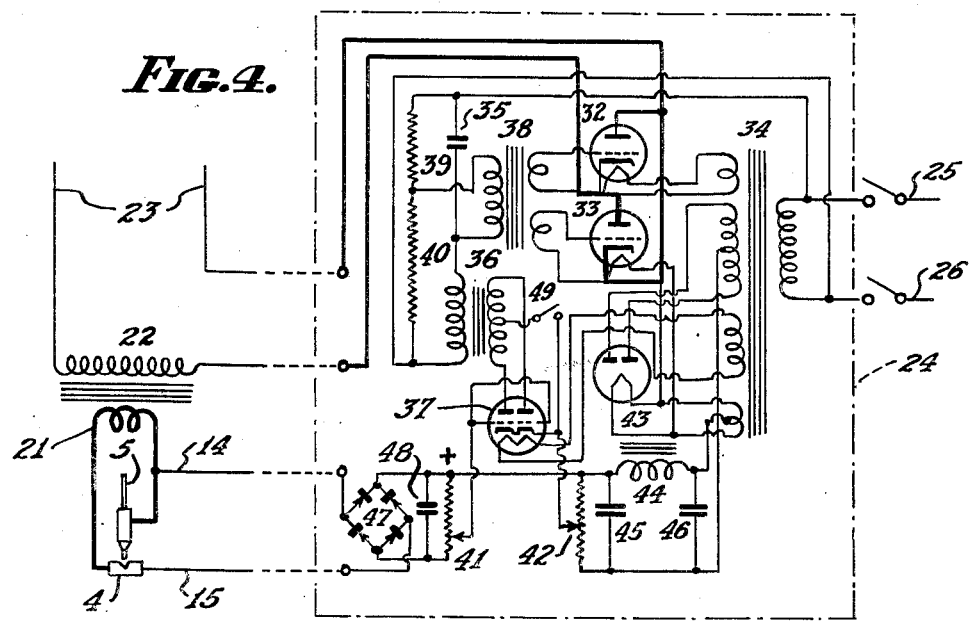

Figure 4 corresponds to Figure 2 but illustrates the details of a suitable electronic regulator.

In Figure 1, I have shown diagrammatically a direct current welding apparatus. The armature of a welding generator is indicated at 1, a series field winding at 2, and a shunt field winding at 3. The work 4 and the wire or weld rod 5 are connected to the generator in the usual way. An electronic regulator, which will later be described in detail in an exemplary embodiment is indicated at 6. Power is supplied to it through the power leads 7. It will be noted that the shunt field of the generator is connected to the output circuit 8 of the electronic regulator. The control circuit 9 of this regulator is connected in shunt to the arc.

In operation the electronic regulator is adjusted for the desired arc voltage and the wire feed is started. As soon as the wire touches the work an arc forms; and the welding voltage tends to drop. Any drop, however, is immediately communicated through the arc shunt circuit 9 to the regulator, which increases the shunt field current until the arc voltage has risen to the pre-selected value. The arc voltage is thus maintained at a nearly constant value, every change in welding conditions being followed by an immediate change in field current and therefore, welding current, which corrects adverse conditions. If the current tends to become such as to burn off the welding wire faster than it is being fed, the arc length will increase, and the arc voltage will rise. The regulator, sensitive to arc voltage, will thereupon decrease the welding current until equilibrium is reached. The regulator thus automatically changes the current to coincide with wire feed. For any particular job, the wire feed rate will be continuous, and the arc current and voltage virtually constant. There is no mechanical inertia or lag of rotating machinery in the control circuit. The control is as rapid as electricity itself, and the welding conditions cannot wander far before they are corrected.

Figure 2 is diagrammatically illustrative of an alternating current arc system in which the arc electrodes 4 and 5 are connected across the secondary 21 of a welding transformer. The primary 22 of this transformer is connected to the power leads 23 through an electronic regulator 24 hereinafter to be described. The primary of the transformer draws alternating current from the power lines at a moderate voltage, and induces a low voltage high amperage current in the secondary 21.

The control circuit of the regulator 24 is connected to the arc shunt circuit 14—15. Power for the control circuits of the regulator is drawn from the power line 23 by leads 25 and 26.

The regulator is so constructed that an increase in arc voltage causes it to pass less current to the primary of the welding transformer. A decrease causes more current to flow and then the welding voltage is maintained. The welding current and therefore the rate of melting of the wire is practically synchronized with the rate of feed of the wire. Any change in arc length and voltage is reflected in the primary current in such a way as to maintain correct arc length and voltage.

In this way, proper arc operation is maintained in spite of tiny and rapid variations in melting rate without changing the mechanical rate of electrode feed.

In the practice of my invention various types of electric regulator may be employed. An exemplary electronic regulator, for a direct current arc system is detailed in Figure 3. The analogy of this figure to Figure 1 will be immediately apparent.

In this system, as has been set forth above, the electronic regulator is used instead of a conventional exciter to energize the shunt field of the welding generator. The regulator current output thus determines the welding current for the arc. The regulator itself is in one aspect a controlled rectified, taking alternating current from the power lines 7 and converting it into direct current for the generator shunt field 3. Thyratron type tubes are used as rectifiers, and the rectified power is capable of rapid variations both small and large.

The exemplary regulator has two type FG-57 thyratron tubes 32 and 33 connected together in a full wave rectifying circuit. The anode current and the heater current for all tubes in the regulator is supplied from a main power transformer 34, the primary of which is connected to the power leads 7.

The average power output of a rectifier of this type for any short duration of time will depend upon the point of the anode voltage cycle at which the tubes fire. Firing is controlled by applying an alternating current voltage to the grids of the thyratrons, and varying the phase angle of this voltage with respect to the anode voltage of the tubes. The phase shift is accomplished by the use of a network in which inductance is balanced against a capacity 35. The phase of the current in the network will be determined by the type of reactance which predominates at any one time.

For control purposes, the reactance balance of the network is varied by changing the inductance of a phase transformer 36, by loading its secondary winding with resistance in the form of a vacuum tube, type 6N7, indicated at 37.

Since the plate resistance of a vacuum tube is dependent upon its grid voltage, I am enabled to employ the arc voltage in the arc shunt circuit 9 to control the resistance of the tube 37 and hence to vary the load on the phasing transformer 36.

The primary of a grid driving transformer 38 is connected between a non-reactive resistance circuit 39, 40 and the reactance circuit 35, 36 as shown. The alternating current voltage on the grids of the thyratrons will be shifted in phase corresponding with changes in the arc voltage.

A potentiometer 41 in the arc shunt circuit allows for sensitivity adjustment; and a bias potentiometer 42 permits adjustment of the arc voltage. Direct current for the bias potentiometer is supplied by a type 83 full wave diode rectifier 43 through a smoothing filter comprising a choke 44 and condensers 45 and 46.

If in welding the arc voltage should rise, signifying that the arc path has become too long, the negative voltage on the tube 37 will rise and the resistance of the tube will increase. By consequence, the load on the transformer 36 will decrease and the reactance of the primary of this transformer will increase. Such an increase of inductance brings about a greater lag in the grid voltage of the thyratrons, and these will fire later in the anode voltage cycle. The output of the thyratron rectifier system is connected as shown by leads 8 to the shunt winding 3 of the welding generator. A firing of the thyratrons at a later point in the anode voltage cycle means less current in the generator field winding. The arc current will therefore decrease, and the rate of melting of the electrode will be returned to normal. Control in reverse order occurs if the arc tends to become too short.

In Figure 4 I have detailed an exemplary form of electronic regulator which may be used in an alternating current arc system, and the analogy of this figure to Figure 2 will be apparent. The parts of the regulator are substantially the same and like parts have been given like index numerals. In this instance, the regulator acts as a valve, offering varying degrees of resistance to the flow of current. Hence it is connected in series with the primary 22 of the welding transformer in the circuit including the power leads 23. The essential difference between this regulator and the regulator 6 in Figure 3 is that the thyratrons 32 and 33, instead of being connected for full wave rectification are connected back to back and permit current to flow on each half of the alternating current cycle. Again, however, the amount of current flowing depends upon the point of the anode voltage cycle at which the tubes are allowed to fire, and the variation of the firing point is accomplished by phase shift control in the same manner as hereinabove described.

Since a direct current is desirable for controlling the tube 37, I provide a bridge rectifier 47 and a filtering condenser 48 in the arc shunt circuit 14, 15 ahead of the arc potentiometer 41. A switch 49 may be used as an on and off control for the welding current. Otherwise, the parts are the same and function in the same manner.

Modifications may be made in my invention without departing from the spirit of it. While I have described my invention in connection with welding operations in which an arc electrode is or may be fed to the work at a constant speed, my systems of control are applicable to any type of arc operation for the attainment of uniform conditions of welding or metal deposition in spite of variations which may occur at the arc. Having described my invention in certain exemplary embodiments what I claim as new and desire to secure by Letters Patent is:

1. In an alternating current arc system, an arc transformer having a secondary connected to arc electrodes, and a primary connected to power leads, means acting as a valve in said last mentioned connection, a circuit in shunt to said arc electrodes, and an inverse connection between said circuit and said valve acting means.

2. In an alternating current arc system, an arc transformer having a secondary connected to arc electrodes, and a primary connected to power leads, means acting as a valve in said last mentioned connection, a circuit in shunt to said arc electrodes, and an inverse connection between said circuit and said valve acting means, said valve acting means comprising an electronic rectifier, and said connection including means for modifying the action of said rectifier.

3. In apparatus for continuous welding, in which an arc is struck between work to be welded and an expendable electrode, source means for supplying an arc potential, and means for controlling the potential produced at the source in accordance with the occurrence of sporadic changes in welding conditions, said last mentioned means comprising a circuit in shunt to the arc, means for amplifying the output of said circuit and means for causing said amplified output to modify the potential produced by said source, said source being a source of alternating current and said means for modifying the potential of said source comprising a phase shifting circuit for causing said amplified output to modify the time duration of half-cycles of said alternating current.

4. In apparatus for continuous arc welding by means of an expandable electrode fed at a constant speed toward the work to be welded, and a source of potential supplied to said electrode and workpiece through a transducer having input and output windings; an automatic arc voltage control mechanism including thyratrons in series with said input winding, a voltage measuring circuit across said arc, and a phase shifting circuit, responsive to said voltage measuring circuit, for controlling the phase relationship of the control grids with respect to the anodes of said thyratrons, such that the instant of firing of the thyratrons in each half cycle is postponed progressively with an increase in voltage across the arc, whereby the power input to the input winding of said transducer is varied to control the rate of burning of said electrode to maintain a substantially constant voltage across said arc.

5. In apparatus for continuous arc welding, a generator for supplying direct current arc potential to an arc struck between work to be welded and an expendable electrode, a circuit in shunt to said arc, a pair of thyratrons in push-pull relationship, means for dephasing the grid and plate voltages thereof, both of which are alternating, means for causing the output of said shunt circuit to control the degree of said dephasing, and means for impressing the output of said thyratrons on a field winding of said generator.

6. Apparatus according to claim 4 in which said transducer is constituted by a D. C. generator, the field of said generator being the input winding.

7. Apparatus according to claim 4 in which the transducer is an A. C. welding transformer.

8. Apparatus according to claim 7 in which means are provided for rectifying the current in said shunt circuit.

9. In apparatus for continuous arc welding by means of an expendable electrode fed at a constant speed toward the work to be welded, and a source of potential supplied to said electrode and workpiece through a transducer having input and output windings; an automatic arc voltage control mechanism including thyratrons in series with said output winding, a voltage measuring circuit across said arc, and a phase-shifting circuit, said phase shifting circuit including a transformer and a vacuum tube, and a network in which inductance of the primary of said transformer is balanced against capacitance, and in which the secondary of said transformer is variably loaded with the plate resistance of said vacuum tube, the grid bias of said vacuum tube being supplied and controlled by said voltage measuring circuit, for controlling the phase relationship of the control grids with respect to the anodes of said thyratrons, such that the instant of firing of the thyratrons in each half cycle is postponed progressively with an increase in voltage across the arc, whereby the power input to the input winding of said transducer is varied to control the rate of burning of said electrode to maintain a substantially constant voltage across said arc.

10. Apparatus according to claim 9 in which said transducer is constituted by a D. C. generator, the field of said generator being the input winding.

11. Apparatus according to claim 9 in which the transducer is an A. C. welding transformer.

12. Apparatus according to claim 11 in which means are provided for rectifying the current in said shunt circuit.

ALLEN DALE WILEY.

References Cited in the file of this patent

UNITED STATES PATENTS

| Number | Name | Date |
|---|---|---|
| 1,392,436 | Morton | Oct. 4, 1921 |
| 2,166,309 | Lord | July 18, 1939 |
| 2,332,950 | Tannheim | Oct. 26, 1943 |
| 2,390,214 | Grabau | Dec. 4, 1945 |
| 2,458,658 | Tyrner | Jan. 11, 1949 |
| 2,476,911 | Reilly et al. | July 19, 1949 |
| 2,504,878 | Reilly | Apr. 18, 1950 |

OTHER REFERENCES

Std. Handbook for Elec. Engrs., Knowlton, 8th Ed., pp. 548(1). (Copy in Div. 37.)